US009411581B2

(12) United States Patent
Peled

(10) Patent No.: US 9,411,581 B2
(45) Date of Patent: Aug. 9, 2016

(54) CODE MIGRATION SYSTEMS AND METHODS

(71) Applicant: Gizmox Transposition Ltd., Kibutz Shamir (IL)

(72) Inventor: Guy Peled, RaAnana (IL)

(73) Assignee: Gizmox Transposition Ltd., Kibutz Shamir (IL)

( * ) Notice: Subject to any disclaimer, the term of this patent is extended or adjusted under 35 U.S.C. 154(b) by 0 days.

(21) Appl. No.: 14/394,312

(22) PCT Filed: Apr. 18, 2013

(86) PCT No.: PCT/IL2013/050338
§ 371 (c)(1),
(2) Date: Oct. 14, 2014

(87) PCT Pub. No.: WO2013/157008
PCT Pub. Date: Oct. 24, 2013

(65) Prior Publication Data
US 2015/0082290 A1    Mar. 19, 2015

Related U.S. Application Data

(60) Provisional application No. 61/625,800, filed on Apr. 18, 2012.

(51) Int. Cl.
*G06F 9/45* (2006.01)
*G06F 9/44* (2006.01)

(52) U.S. Cl.
CPC ... *G06F 8/76* (2013.01); *G06F 8/51* (2013.01)

(58) Field of Classification Search
CPC .............. G06F 8/47; G06F 8/51; G06F 8/42; G06F 8/33; G06F 8/70; G06F 8/75; G06F 11/3672; G06F 17/30908; G06F 8/76; G06F 17/303; G06Q 40/00; H04L 41/0843
See application file for complete search history.

(56) References Cited

U.S. PATENT DOCUMENTS 4,667,290 A * 5/1987 Goss .................. G06F 8/47
                                                  713/1
6,745,384 B1   6/2004 Biggerstaff
(Continued)

FOREIGN PATENT DOCUMENTS

WO    WO 2013/157008    10/2013

OTHER PUBLICATIONS

International Preliminary Report on Patentability Dated Oct. 30, 2014 From the International Bureau of WIPO Re. Application No. PCT/IL2013/050338.
(Continued)

*Primary Examiner* — Tuan Vu

(57) ABSTRACT

A method of converting a precompiled source code. The method comprises receiving a precompiled source code of an application, providing a plurality of AST segment patterns each associated with another of a plurality of replacement code templates, building an abstract syntax tree (AST) of the precompiled source code, matching between a first group of the plurality of AST segment patterns and a plurality of AST segments of the AST to identify a second group of the plurality of replacement code templates, the plurality of AST segments are associated with a plurality of source code segments of the precompiled source code, and performing a code migration process of the precompiled source code to a precompiled migrated code of the application using the second group.

15 Claims, 11 Drawing Sheets

(56) References Cited

U.S. PATENT DOCUMENTS

| | | | |
|---|---|---|---|
| 8,453,126 B1* | 5/2013 | Ganelin | G06F 8/42 717/136 |
| 2004/0031015 A1 | 2/2004 | Ben-Romdhane et al. | |
| 2004/0068716 A1* | 4/2004 | Stevens | G06F 8/47 717/140 |
| 2004/0103405 A1* | 5/2004 | Vargas | G06F 8/51 717/137 |
| 2005/0004942 A1* | 1/2005 | Madsen | H04L 41/0843 |
| 2005/0138606 A1 | 6/2005 | Basu et al. | |
| 2005/0166193 A1 | 7/2005 | Smith et al. | |
| 2005/0213722 A1 | 9/2005 | Stormon et al. | |
| 2006/0178858 A1 | 8/2006 | Trowbridge et al. | |
| 2007/0055966 A1 | 3/2007 | Waddington et al. | |
| 2007/0226708 A1* | 9/2007 | Varma | G06F 8/51 717/139 |
| 2008/0222616 A1 | 9/2008 | Cheng et al. | |
| 2010/0121668 A1* | 5/2010 | Hohmann | G06Q 40/00 705/35 |
| 2010/0199263 A1 | 8/2010 | Clee et al. | |
| 2010/0269096 A1 | 10/2010 | Araya et al. | |
| 2011/0131548 A1 | 6/2011 | Colton et al. | |
| 2012/0079463 A1* | 3/2012 | Freeman | G06F 8/70 717/137 |
| 2012/0117535 A1* | 5/2012 | Pointer | G06F 8/33 717/107 |
| 2012/0311546 A1* | 12/2012 | Fanning | G06F 8/75 717/136 |
| 2013/0007065 A1* | 1/2013 | Grechanik | G06F 17/30908 707/802 |
| 2013/0067437 A1* | 3/2013 | Chen | G06F 11/3672 717/124 |

OTHER PUBLICATIONS

International Search Report and the Written Opinion Dated Oct. 11, 2013 From the International Searching Authority Re. Application No. PCT/IL2013/050338.

Invitation to Pay Additional Fees Dated Aug. 8, 2013 From the International Searching Authority Re. Application No. PCT/IL2013/050338.

Supplementary European Search Report and the European Search Opinion Dated Oct. 23, 2015 From the European Patent Office Re. Application No. 13778367.6.

\* cited by examiner

Code segment A:
- Buy solution | Remove solution
- Developer Y™
- Price: 5.99$
- Release date: 2/1/2044

Code segment B:
- Buy solution | Remove solution
- Developer C™
- Price: 0.99$
- Release date: 9/9/2045

Code segment C:
- Buy solution | Remove solution
- Developer X™
- Price: FREE
- Release date: 1/9/2045

Code segment D:
- Buy solution | Remove solution
- Developer C™
- Price: 44.99$
- Release date: 1/3/2043

Code segment E:
- Buy solution | Remove solution
- Developer Y™
- Price: 9.99$
- Release date: 9/9/2045

Total conversion cost: 63.96$

FIG. 6

CODE MIGRATION SYSTEMS AND METHODS

RELATED APPLICATIONS

This application is a National Phase of PCT Patent Application No. PCT/IL2013/050338 having International filing date of Apr. 18, 2013, which claims the benefit of priority under 35 USC §119(e) of U.S. Provisional Patent Application No. 61/625,800 filed on Apr. 18, 2012. The contents of the above applications are all incorporated by reference as if fully set forth herein in their entirety.

FIELD AND BACKGROUND OF THE INVENTION

The present invention, in some embodiments thereof, relates to code migration and, more particularly, but not exclusively, to code migration systems and methods and an online solutions store.

Information Technology (IT) systems play a large part in the routine activities of a majority of today's business operations. When an IT system is phased out, businesses usually upgrade to a newer version or change to a different system altogether. When upgrading to a newer version, the process is usually fast with little to no downtime.

Businesses may also decide to change an existing IT system to a different system altogether due to mergers, spin-offs, or other business decisions. When installing a new IT system, users often desire to have applications from the previous IT system available in the new IT system. In order to implement applications from one IT system or platform to a new IT system or platform, the desired applications of the older system are often converted into the new IT system. Typically, conversions from an existing IT system to a new IT system are manually done in order to implement the desired applications from the old IT system into the new IT system. This conversion is also known as code migration.

During the last years a number of automatic tools for code migration have been developed. For example, U.S. Patent Application Pub. No 2005/0138606, filed on Dec. 17, 2003, describes a method for converting data suitable for use on a source platform into data suitable for use on a target platform comprises analyzing source platform code; extracting information from the analyzed source platform code wherein the extracted information includes at least the logic, flow, user interface description, and data of the source platform code; defining a generic data structure and format for storing the extracted information; storing the extracted information in the defined structure and format; and transforming the extracted information into code suitable for the target platform wherein the transforming step comprises transforming the extracted information into code suitable for the target platform after the extracted information is stored in the defined structure and format.

SUMMARY OF THE INVENTION

According to some embodiments of the present invention, there are provided a method of converting a precompiled source code. The method comprises receiving a precompiled source code of an application, providing a plurality of AST segment patterns each associated with another of a plurality of replacement code templates, building an abstract syntax tree (AST) of the precompiled source code, matching between a first group of the plurality of AST segment patterns and a plurality of AST segments of the AST to identify a second group of the plurality of replacement code templates, the plurality of AST segments are associated with a plurality of source code segments of the precompiled source code, and performing a code migration process of the precompiled source code to a precompiled migrated code of the application using the second group.

Optionally, the performing comprises displaying a presentation of the precompiled source code with an indication of the plurality of source code segments to a user and receiving code editing instructions from a user to adapt the code migration process.

More optionally, the method further comprises receiving at least one of the plurality of AST segment patterns associated with another of the plurality of replacement code templates from the user and using the at least one AST segment pattern during the code migration process.

Optionally, the precompiled source code is coded for a source environment and the precompiled migrated code is encoded for a target environment; wherein the source environment and the target environment are different.

Optionally, the method further comprises assembling a plurality of replacement precompiled code segments each generated according to another of the plurality of replacement code templates during the code migration to create the precompiled migrated code.

Optionally, each of at least some of the plurality of AST segment patterns having a matching condition associated with a parameter, the matching comprises verifying a compliance of a respective parameter in a matched precompiled source code segment with the matching condition.

Optionally, each of at least some of the plurality of AST segment patterns having a matching condition associated with a plurality of interchangeable target parameters, the matching comprises selecting one of the plurality of interchangeable target parameters according to a value of a parameter of a precompiled source code segment associated with a respective the AST segment.

Optionally, the building comprises using the AST to build an object model representing a plurality of objects of the application; the matching comprises matching between the first group and the plurality of AST segments based on the plurality of objects.

More optionally, the object model is a document object model (DOM).

More optionally, the object model is generated according to shadow environment components which are extracted from the source code and allow generating the object model without having them installed or reflected during the matching.

Optionally, each the AST segment pattern is stored with an associated the replacement code template in a common mapping expression record.

According to some embodiments of the present invention, there are provided a method of managing a system for code migration. The method comprises providing a precompiled source code of an application, matching between a plurality of replacement code templates and some of a plurality of source code segments of the precompiled source code, generating a presentation of the precompiled source code with an indication of which of the plurality of associated source code segments is not associated with the plurality of replacement code templates, and displaying the presentation to a user.

Optionally, the presentation is displayed in a code editor window.

According to some embodiments of the present invention, there are provided a system of converting a precompiled source code. The system comprises a database which hosts a plurality of mapping expression records each associates between one of a plurality of AST segment patterns and one of a plurality of replacement code templates, an interface which receives a precompiled source code of an application, a mapping module which builds an abstract syntax tree (AST) of the precompiled source code and associates a plurality of AST segments of the AST with a plurality of source code segments of the precompiled source code, and a code editor which displays a presentation of the precompiled source code with an indication of the plurality of source code segments and receives code editing instructions from a user to adapt a code migration process of the precompiled source code to a migrated code of the application using a templates group of the plurality of replacement code templates.

Optionally, the mapping module matches between a patterns group of the plurality of AST segment patterns and the plurality of AST segments to identify the templates group.

Optionally, the code editor allows a user to edit at least one of the plurality of mapping expression records.

According to some embodiments of the present invention, there are provided a method of providing one or more mapping expressions for code migration. The method comprises receiving a precompiled source code of an application, generating an offer to purchase a right to use a mapping expression for each of at least some of a plurality of precompiled source code segments of the precompiled source code, generating a presentation which visually associate between each of the at least some precompiled source code segments and a respective the offer, and displaying the presentation to allow a user to accept the respective offer for each of the plurality of precompiled source code segments.

Optionally, the mapping expression is associated with a solution provider ranking and the offer is presented in association with respective the user ranking.

Optionally, in the presentation each the offer is visually associated with a clicking button for indicating an offer acceptance.

Optionally, the generating comprises generating a plurality of offers to purchase a right to use a plurality of mapping expressions for converting one of the plurality of precompiled source code segment, each the plurality of mapping expressions having at least one of a different cost, a different solution provider, and a different solution provider ranking.

More optionally, the method further comprises receiving a bid for receiving at least one new offer for a new mapping expression for at least one of the plurality of precompiled source code segments from a user, forwarding the bid to a plurality of solution providers.

Optionally, the generating an offer further comprises providing a dataset of a plurality of mapping expressions each comprises a plurality of AST segment patterns associated with a replacement code template and a cost value, building an abstract syntax tree (AST) of the precompiled source code, automatically matching between a plurality of AST segments of the AST which are associated with the plurality of precompiled source code segments and the plurality of AST segment patterns to identify a group from the plurality of mapping expressions, and providing the group as a plurality of offers each for another of the plurality of mapping expressions.

According to some embodiments of the present invention, there are provided a system of managing replacement code templates usage. The system comprises a dataset of a plurality of mapping expressions each comprises an AST segment pattern associated with a replacement code template and a cost value, a mapping module which automatically matches between a precompiled source code and at least one respective the AST segment pattern of at least one respective of the plurality of mapping expressions, and a billing module which generates at least one offer to purchase a right to use the at least one respective mapping expression.

According to some embodiments of the present invention, there are provided a system of managing a marketplace of mapping expressions. The system comprises a database which stores a plurality of mapping expressions received from plurality of mapping expression solution providers via a communication network, each the mapping expression adjusted to match one of a plurality of AST segment patterns, an interface which receives a plurality of mapping expression requests via the communication network, each the mapping expression request indicates a precompiled source code, a matching module which matches per the mapping expression request at least one of the plurality of mapping expressions according to a match between a segment of the precompiled source code and a respective the AST segment pattern, and a billing module which credits at least one of the plurality of solution providers and billing at least one requestor sending the plurality of mapping expression requests as an outcome of the match.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is a schematic illustration of an exemplary shopping list, according to some embodiments of the present invention;

DESCRIPTION OF EMBODIMENTS OF THE INVENTION

Figure 1:
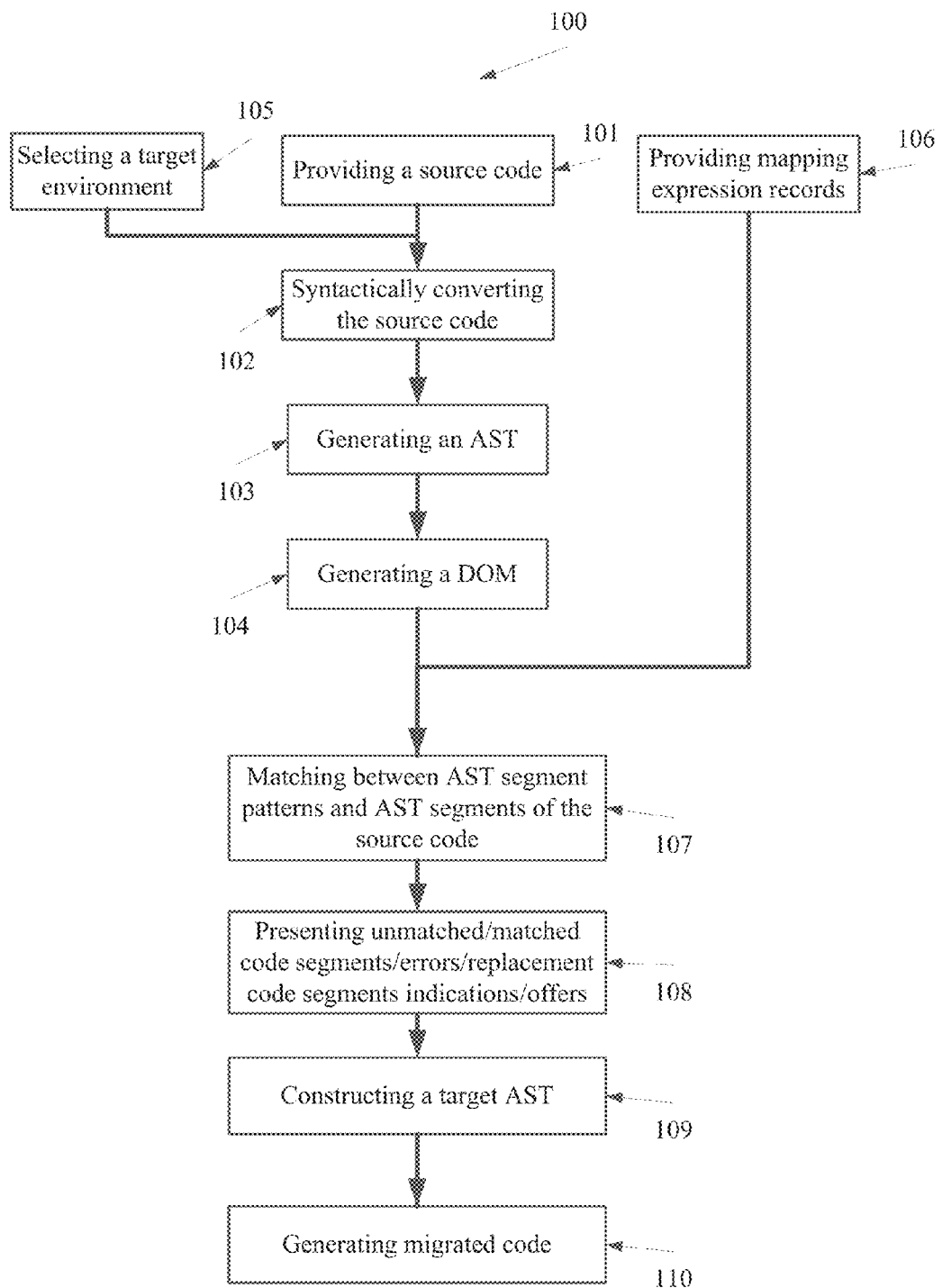
FIG. 1 is a flowchart of a method of semi-automatic conversion of a precompiled source code of an application in a source environment to a respective precompiled converted code of the same application in a target environment, according to some embodiments of the present invention.

The present invention, in some embodiments thereof, relates to code migration and, more particularly, but not exclusively, to code migration systems and methods and an online solutions store.

According to some embodiments of the present invention, there are provided systems and methods that allow a user, such as a developer, to participate in a code migration process of a precompiled source code. The systems and methods map source code segments of the precompiled source code to suggested conversion solutions (i.e. mapping expressions), and/or indicate to the user which source code segments of the precompiled source code have not been mapped. The methods and systems allow users to control the migration process by creating and/or editing mapping expressions, identifying which target code segment is used to replace which source code segment, selecting conversion solutions, purchasing conversion solutions and/or the like. As used herein, a code migration means a process in which code is converted to another technology environment, another programming language, upgraded from one version of a programming language to another version of the same programming language, and/or the like.

Optionally, the mapping is performed by matching AST segment patterns with at least some AST segments of the precompiled source code. Each matched AST segment pattern is optionally associated with a target code template. During the migration process, a target code template converts a source code segment associated with a respective AST segment pattern. An AST segment pattern-target code template association may be referred to herein as a mapping expression.

Optionally, the outcome of the matching is presented to a user, allowing him to edit the AST segment patterns and/or the target code templates, which may be used for conversion, and/or creating user-defined mapping expressions for source code segments that do not have matching AST segment patterns. Optionally, the user decides, based on the information presented thereto, to convert a certain source code segment using a matched mapping expression. Optionally, the user decides to decline a conversion (migration) that is based on a certain matched mapping expression. Optionally, the user decides to select another target code template of another matching mapping expression.

Optionally, a database of mapping expression records is used for the matching, where each record associates between a certain AST segment pattern and a target code template. In use, a user selects and/or uploads a precompiled source code. The precompiled source code is optionally syntactically converted from a legacy application code to a source code in a language having known syntax. The precompiled source code is then parsed to create an AST. Optionally, the AST is analyzed to create an object model, such as a document object model (DOM) of the source environment of the source code. The AST of the source code, optionally based on DOM data, is matched with AST segment patterns to identify suitable mapping expressions which later may be used for generating a target code in a target environment. When no match is found between some of the AST source code segments and AST segment patterns in some of the available mapping expression records, the user may be notified, for example, by error indications.

According to some embodiments of the present invention, mapping expressions for unmatched AST of source code segments may be purchased from an online service, which manages a database of mapping expressions. In the database, each mapping expression is optionally associated with a cost value. Optionally, a number of mapping expressions are offered for converting the same code segment. These mapping expressions may be provided by different developers and/or priced in a different manner.

Optionally, mapping expressions for purchase may be identified by an analysis of the source code. This allows automatically presenting to the user a plurality of purchase offers for matching mapping expressions.

Before explaining at least one embodiment of the invention in detail, it is to be understood that the invention is not necessarily limited in its application to the details of the construction and the arrangement of the components and/or methods set forth in the following description and/or illustrated in the drawings and/or the examples. The invention is capable of other embodiments or of being practiced or carried out in various ways.

Reference is now made to FIG. 1, which is a flowchart 100 of a method of a semi-automatic conversion of a precompiled source code of an application in a source environment, to a respective precompiled converted code of the same application, optionally in a target environment, according to some embodiments of the present invention. The precompiled source code and converted code are optionally in different languages. As used herein, semi-automatic conversion means a process wherein predefined mapping expressions are automatically matched to source code segments, and wherein the user is involved in the code migration process by editing predefined mapping expressions and/or creating new mapping expressions.

The mapping expressions link between source code segments of an uploaded or selected precompiled source code and replacement code segments, optionally suggested. These mapping expressions allow generating the outcome of a converted precompiled source code, which is set to run as an application in the target environment.

Figure 2A:
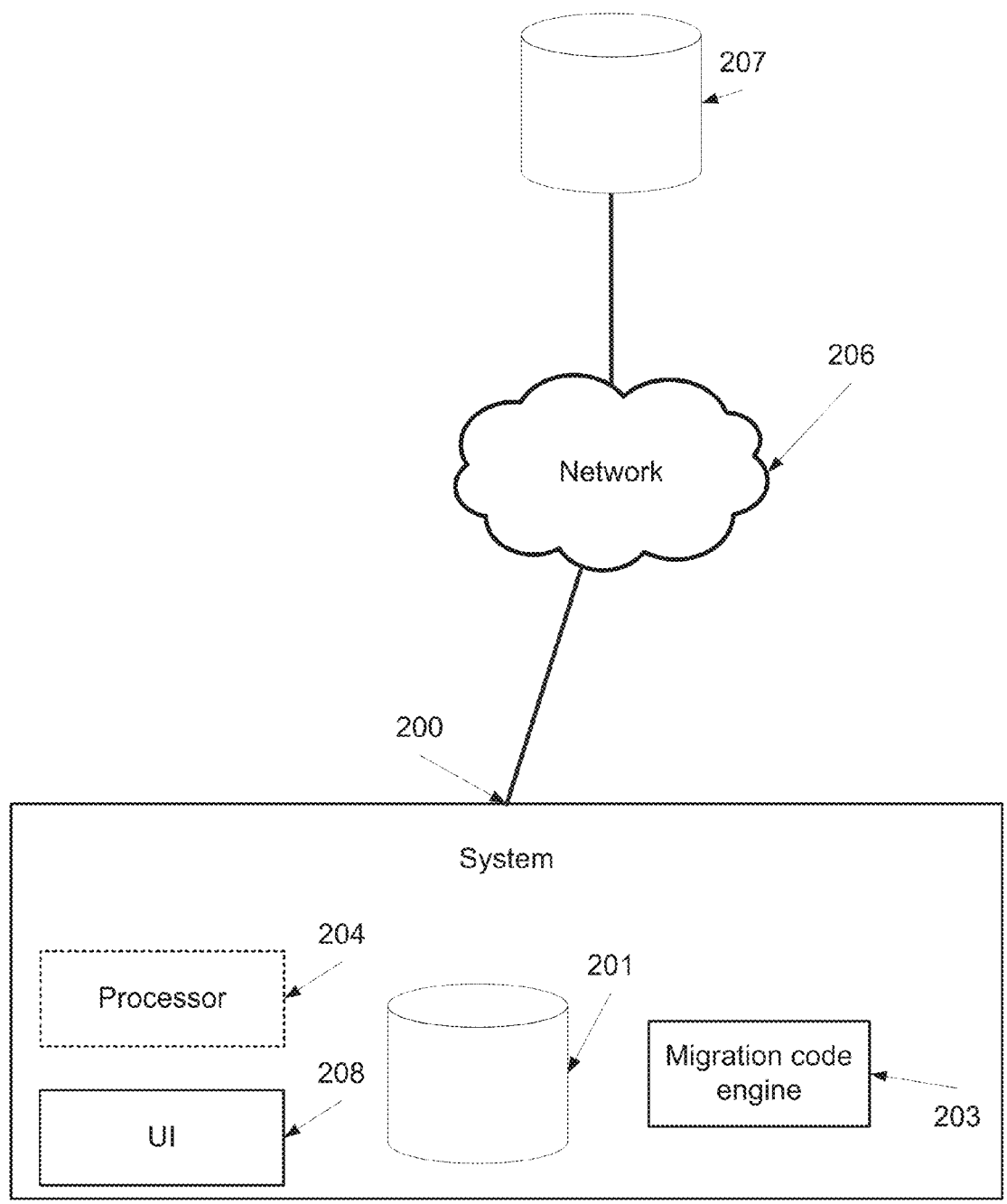
FIGS. 2A and 2B are schematic illustrations of a system of semi-automatic conversion of a precompiled source code, according to some embodiments of the present invention.
Figure 2B:
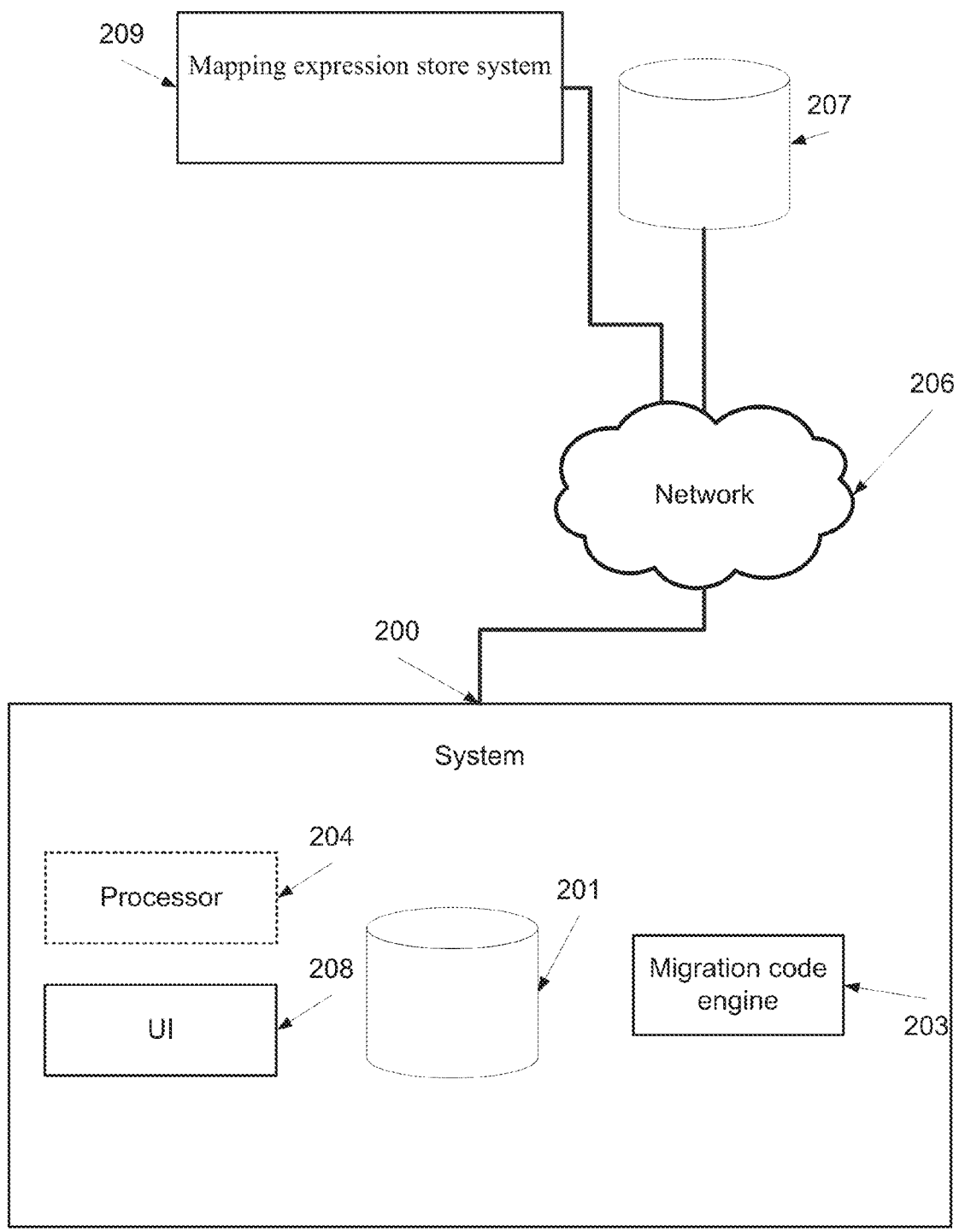

Reference is also made to FIGS. 2A and 2B, which are schematic illustrations of a code migration system 200 of semi-automatic conversion of such a precompiled source code, using a processor 204 of a hosting computing device, according to some embodiments of the present invention.

The method 100 and system 200 may be used to convert an application from one technological environment and/or programming language to another technological environment and/or programming language. For example, converting source code from VB6 to C# or to VB.NET on .NET framework, converting source code from ASP code to ASP.NET, converting COBOL code to WinForms, and/or the like.

Additionally or alternatively, the method 100 and/or system 200 manage code migration that upgrades an application from one version of a programming language to another version of the same programming language. For example, converting an application that was written in ASP.NET 1.1 to the same application in ASP.NET 4.0. In some embodiments, different versions of the same application may be generated for different operating systems, different environments, for instance applications for desktop, web, and/or mobile, different databases, different servers, different backend programs, different end-users, different clouds, and/or the like.

Additionally or alternatively, the method 100 and system 200 may be used for changing code patterns of an application to improve its quality, efficiency, performance, and/or scalability, for example when upgrading code from one application version to another. The method 100 and/or system 200 allow changing the application unit testing, logging, and/or other cohesive areas of functionality, based on an aspect-oriented programming paradigm.

Additionally or alternatively, the method 100 and/or system 200 manage code migration that upgrades an application that runs on an infrastructure that has been upgraded or changed. In such an embodiment, a user, such as an infrastructure developer, may create upgrade rules for the applications executed on the infrastructure. The upgrade rules are provided in an executable file, in the form, for example, of a conversion or an upgrade wizard. When running the executable file, it automatically upgrades the application to the most updated infrastructure version. For example, creating an upgrade wizard for an application that runs on recently upgraded enterprise resource planning (ERP) infrastructure.

The code migration system 200 is locally installed on a client terminal or executed on a network node, such as one or more servers, and/or provided as software as a service (SaaS) solution via a client terminal 205 connected to a computer network. Optionally, the code migration system 200 provides a graphical user interface (GUI) that allows a user to define the target environment and/or conversion properties, for example as defined below.

When the system 100 provides the code migration service as a SaaS, a user interface (UI), such as a graphical user interface (GUI) may be presented using the browser of the client terminal 205. In such an embodiment, the browser may only be responsible for rendering the GUI and for capturing user-inputs, whereas the server executes the system logic. Other computation methodologies may also apply.

In use, the code migration system 200 allows a user, also referred to as a developer, to add a layer of mapping expressions to the uploaded or selected precompiled source code.

In use, matching mapping expressions are automatically identified according to an analysis of the precompiled source code. Optionally, the code migration system 200 includes a database 201 and/or is connected to a database 207 that stores one or more dataset(s) of a plurality of mapping expression records, each includes an AST segment pattern and a replacement code template.

Unlike automatic migration solutions that offer migration solutions with predefined migration options only, the code migration system 200 and/or the method 100 provide open and flexible platform that allows a user to participate actively in the migration process. The user is presented with a GUI that allows her to select conversion solutions and to approve, select, decline, and/or purchase suggested replacement code segments. This platform also allows the user to modify the original application architecture to suit the target environment throughout the migration process.

Figure 3A:
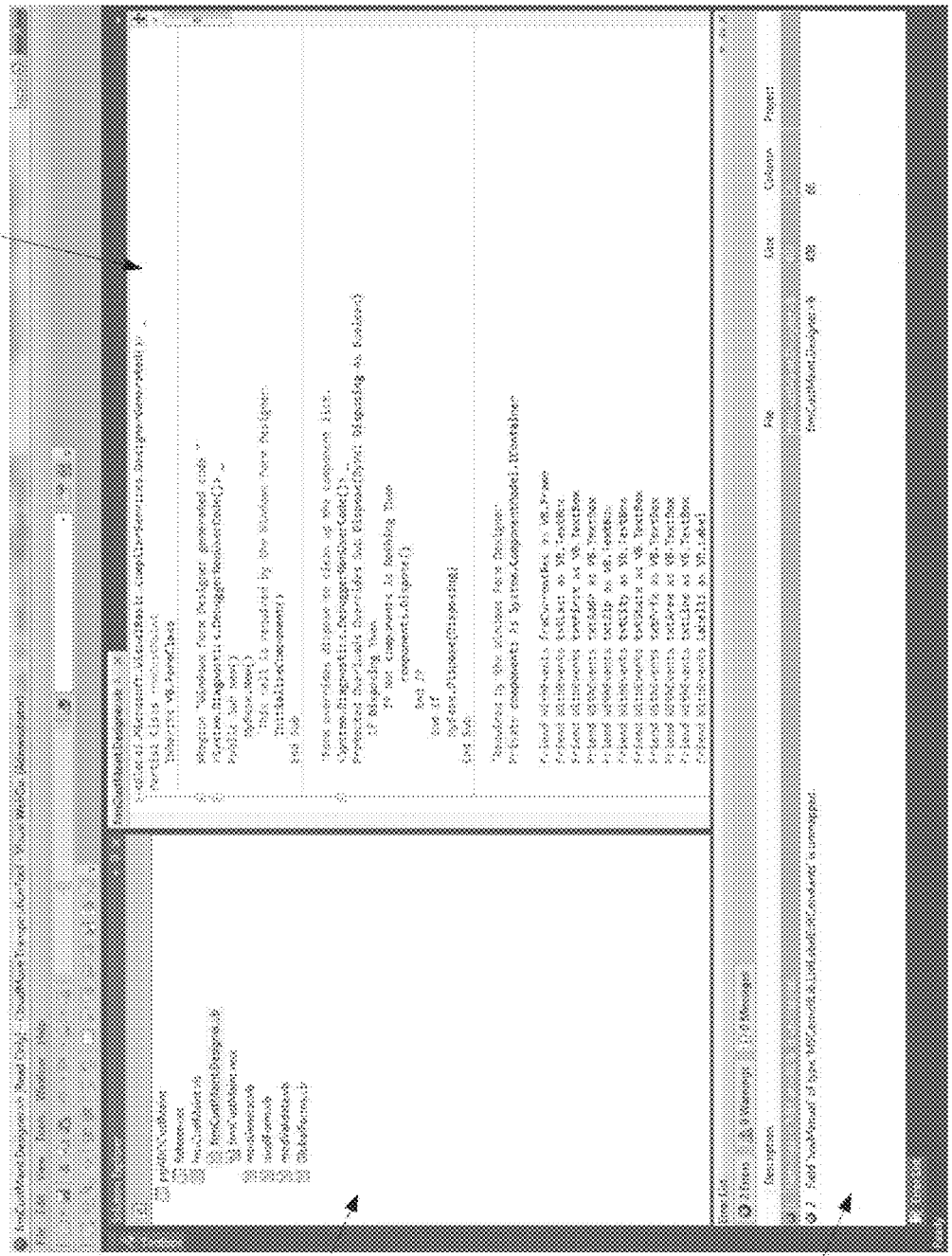
FIG. 3A is a screenshot of a UI presenting exemplary source code on a code editor board together with an explorer board, according to some embodiments of the present invention.

Optionally, the code migration system 200 provides and/or is part of a developer platform, such as an integrated development environment (IDE). This allows automatically generating a code presentation, for example in a code editor, such as a code editor of the IDE, for example Microsoft Visual Studio™. This presentation allows editing and/or creating mapping expressions. For example, as shown at FIG. 3A, the presentation of the source code segments is on a code editor board 310, optionally together with an explorer board 311. The presentation may include an Error List Window 312 that displays a list of unmapped source code segments, optionally along with other migration errors, such as errors occurring during the application loading process. Optionally, the code editor presents to the user information indicative of source code segments that have matching mapping expressions, the replacement code templates of the matching mapping expressions, and optionally source code segments which do not have matching mapping expression.

Optionally, the code editor allows the user to create and add new mapping expressions to the database 201/207. For example the user may create new mapping expressions by defining a code segment that has a certain AST segment pattern and a replacement code that is converted to create a replacement code template that matches the certain AST segment pattern.

Figure 3B:
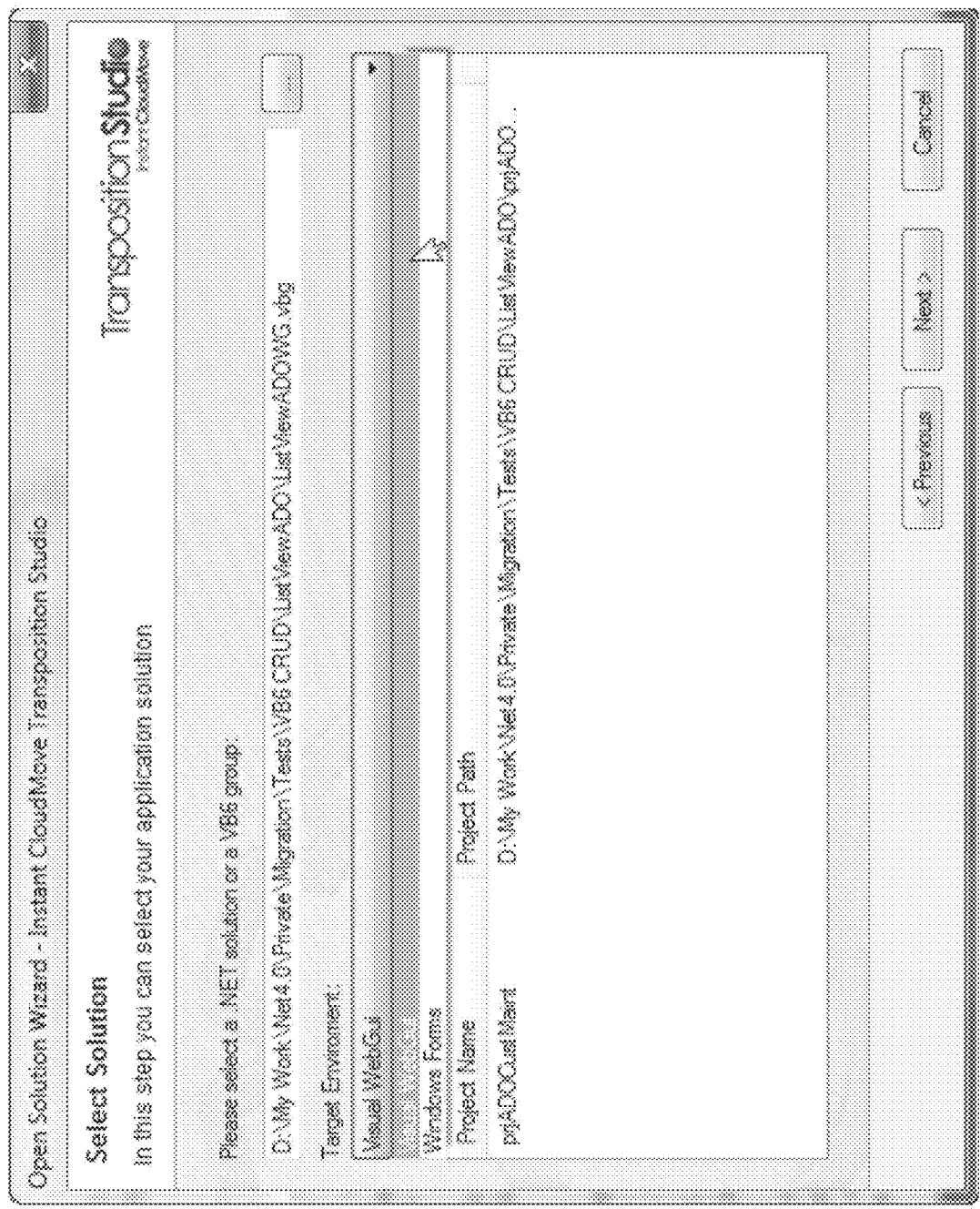
FIG. 3B is a screenshot of a UI facilitating a user to select a source code from a file and a target environment from a combo box, according to some embodiments of the present invention.

With reference to FIG. 1, as shown in 101 and 105, the user selects and/or uploads a source code and selects a target environment. For example, as shown at FIG. 3B, a user may select a source code from a file and a target environment from a combo box. Optionally, the user selects a source code that is loaded and displayed on the code editor. The target environment may be selected automatically and/or set in advance.

Optionally, the user selects and/or uploads a legacy application code, such as Visual Basic 6™ (VB6) code, Windows Form™ code, common business-oriented language (COBOL) code, and/or the like. Optionally, as shown at 102, the legacy application code is syntactically converted to a source code in a language optionally, for brevity also referred to herein as a source code. In such embodiments, the source code may be a code presented on the developer platform working and/or editing area.

As shown at 103, an AST is generated from the source code. Segments of the source code, for example code statements, are mapped to one or more nodes in the AST. As used herein, mapping is referred to linking between a source code and the AST.

Optionally, as shown at 104, an object model of the application is generated using the AST, for instance an application document object model (DOM).

Segments of the source code, for example code statements, are mapped to one or more nodes of the DOM. The DOM provides an object representation of the source environment and the source code. The AST optionally provides a reference to an environment metadata of the DOM. Additionally or alternatively, the DOM is generated according to shadow environment components, which are extracted from the source code. The shadow environment components, which are reflected environment components, allow generating the Application DOM without having them installed and/or reflected during the processing of the source code. The shadow environment components are optionally stored in the database 201/207.

As shown at 106, mapping expression records are provided, for example in the database 201 of the code migration system 200. Each mapping expression record associates between a certain AST segment pattern that has an AST structure and/or a code expression which is later converted to the certain AST segment pattern and a certain replacement code template. The certain replacement code template defined above allows generating a replacement code segment in the selected target environment. Optionally, code expressions are converted to an AST segment pattern using a migration code engine 203. For example, the following expression is an exemplary mapping expression:

this.IsVisible={0} (the assignment expression)
{0}=is Boolean (the parameter's condition).

Figure 4A:
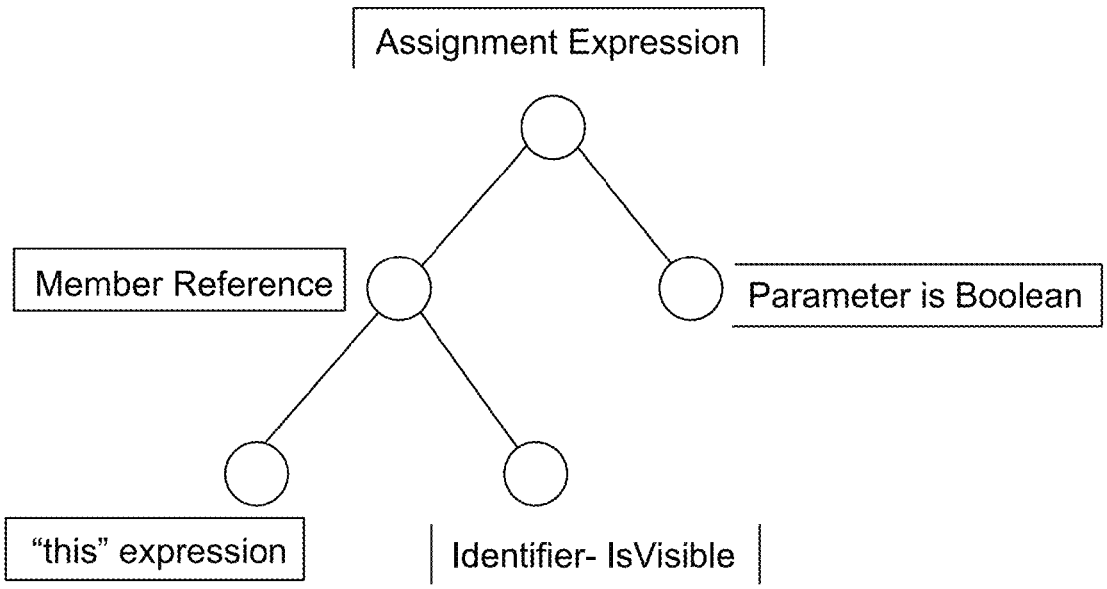
FIG. 4A is an exemplary abstract syntax tree (AST) segment pattern, according to some embodiments of the present invention.

This exemplary mapping expression may be translated by the migration code engine 203 to an AST segment pattern as depicted in FIG. 4A. This exemplary mapping expression is associated with the following replacement code template:

this.Hidden=!{0}

The mapping expressions may be predefined, for example mapping expression records selected and/or extracted from central solution server(s) and/or provided as part of the system, for example during an installation process. Additionally or alternatively, the mapping expressions may be user-defined mapping expressions, which have been defined by a certain user, and optionally include user-defined AST segment patterns and/or user-defined replacement code templates. A user-defined mapping expression record may be created using a designated GUI. This GUI allows the user to select and/or otherwise provide AST segment patterns and/or replacement code templates, and define mapping rules, for example the below taught mapping actions, variables, conditions, and/or the like. Optionally, the user defines an AST segment pattern by providing a code expression that can later be converted to an AST segment pattern using the migration code engine 203.

As shown at 107, AST segment patterns of mapping expressions defined in the records of the database 201 are matched with AST segments of the source code. The matching optionally includes identification of expression mapping records having AST segment patterns which match AST segments that represent source code segments.

Optionally, a number of conditioned and/or excluded parameters are defined in an AST segment pattern. During the matching process, if the condition is met, the AST segment of the source code is considered as matched to the AST segment pattern. If a parameter is excluded, the value thereof is not considered when a respective code segment is checked for a match.

Figure 4B:
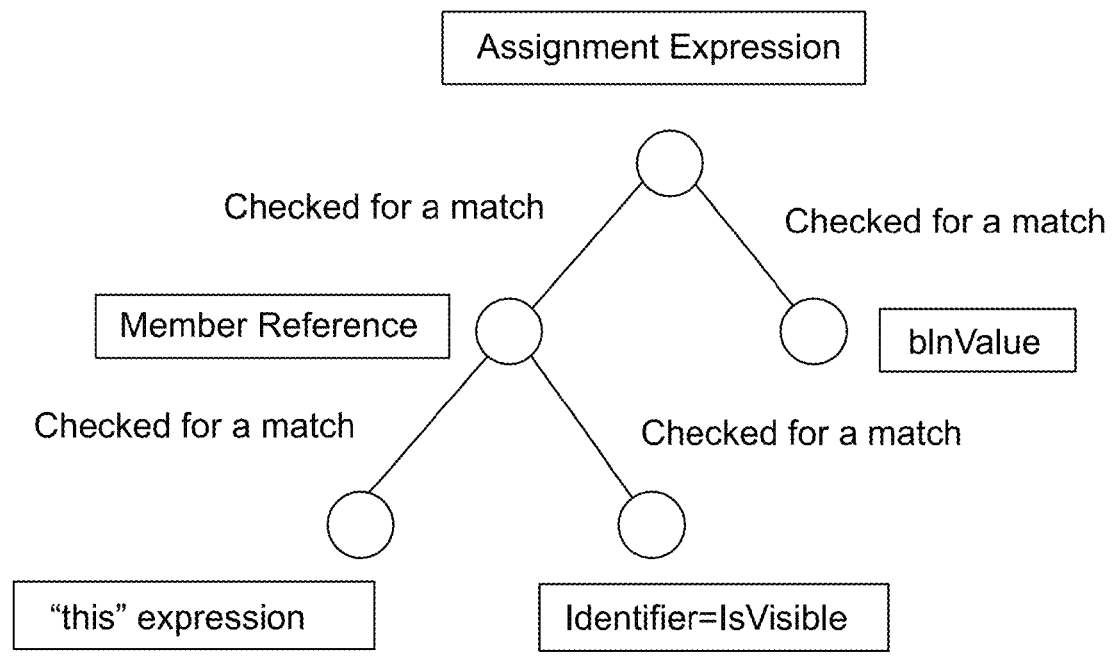
FIGS. 4B-4C are AST segments of an exemplary source code, according to some embodiments of the present invention.
Figure 4C:
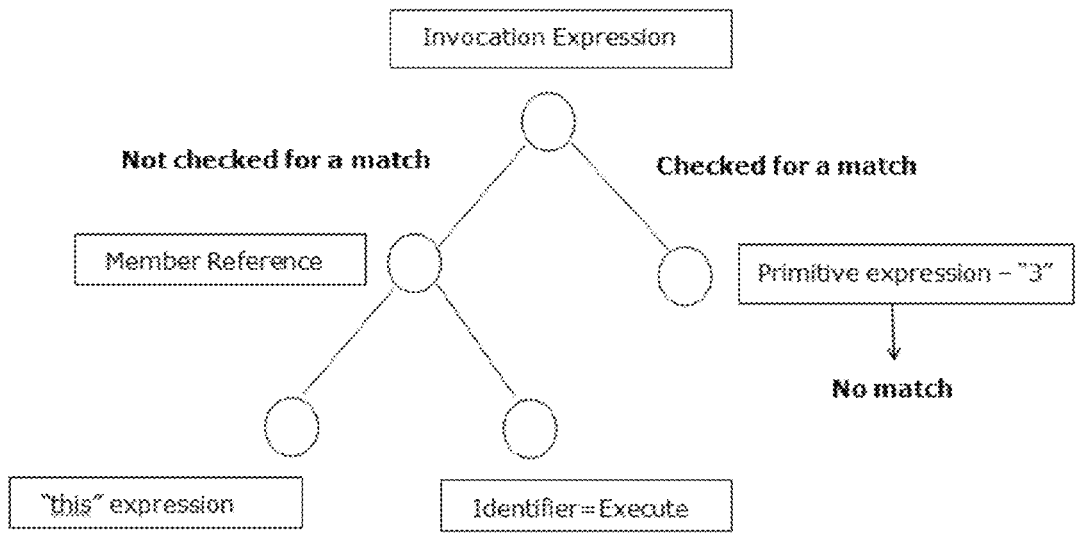

As described above, a mapping expression record includes an AST segment pattern and/or an expression that is translated to an AST segment pattern. During the matching process, different AST segments of the source code are searched to identify a match with an AST segment pattern in any of the mapping expression records. The matching is optionally performed using the DOM, which represents objects that may be addressed within the target environment. For example, the AST segment pattern, which is depicted in FIG. 4A, matches to an AST segment of a source code that is depicted in FIG. 4B, and does not match to any AST segment of the source code that is depicted in FIG. 4C. FIG. 4B is associated with the source code segment this.invisible=blnValue. The AST segment of the source code depicted in FIG. 4B represents an assignment expression that matches to the AST segment pattern that is depicted in FIG. 4A, which also represents an assignment expression. In this case, both sides of the AST segment of the source code are checked for a match against the AST segment pattern, and a full match is found. Consequently, the source code segment that is represented by the sub AST (this.invisible=blnValue) is replaced by the respective replacement code template (this.Hidden=!{0}) in the target environment. On the other hand, FIG. 4C, which depicts a sub AST that represents the source code segment this.Execute(3), shows an invocation expression that does not match to the AST segment pattern depicted in FIG. 4A. However, as the right-side of the sub AST may include an invocation expression, it is checked for a match. As it does not contain the requested assignment expression but the primitive expression "3", the entire sub AST does not match the pattern.

Optionally, some or all of the AST segment patterns are associated with matching conditions such as a range of values. These conditions are placed on parameters, which are specific code elements in the AST segment. When a parameter is conditioned, when the condition is met, the AST segment pattern and the AST segment of the source code are considered as a match. The matching conditions optionally include object type and/or attribute conditions, which are set to be verified by analyzing the DOM. This DOM may represent signatures of object types, object properties (attributes), and/or methods. For example, an exemplary mapping expression, which includes the following code expression with a conditioned parameter for a statement expression, is provided:

while not {0}
{1}
End while
{0}=is <Object of type RecordSet>.EOF (the parameter's condition).

Figure 4D:
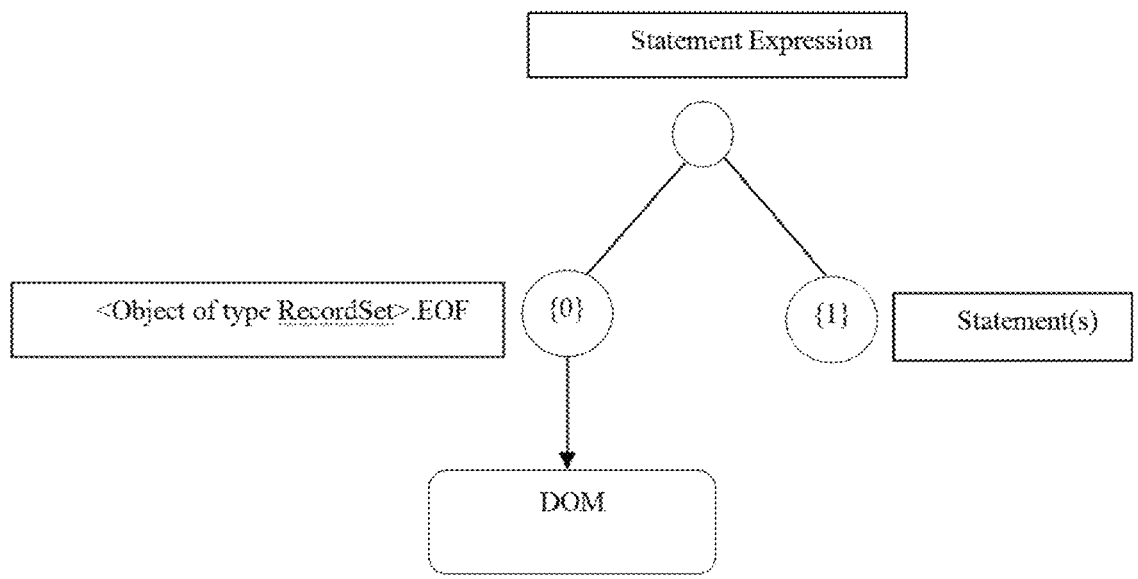
FIG. 4D is an exemplary AST segment pattern, according to some embodiments of the present invention.

This exemplary mapping expression may be translated by the migration code engine 203 to an AST segment pattern as depicted in FIG. 4D. When matching this AST segment pattern the compliances of the conditioned matching parameter Object of type RecordSet may be verified according to the DOM data, for example in determining whether a node in the AST of the source code matches the AST segment pattern of the mapping expression.

Additionally or alternatively, a mapping expression may include one or more mapping actions, which define how and optionally when to convert a value of a source code segment in a source environment to a matching value in a target code segment in a target environment, for example a function. As used herein, a mapping action is optionally a function that converts a value in the source code to a matching value in the converted code. For example, the source value, old value, in the term (instance)Item_Type1.property1=(old value) may be converted to a target value, new value, in the term (instance)Item_Type1.property1=(new value), where Item_Type denotes a specific item in the environment that has a specific property, and instance denotes every instance in the code of the Item_Type.

Optionally, the AST segment pattern represents a number of expressions in the source code. For example, an exemplary mapping expression record, which is suitable for a source environment VB6 and a target environment C-Sharp (C#) .NET, includes an exemplary AST segment pattern that is based on the expressions MyPictureBox.X={0} and MyPictureBox.Y={1} is defined as (either predefined in the system or defined by the user), X and Y are defined as parameters (either system or user-defined), and MyPictureBox.size=new size ({0}, {1}) is defined as a replacement code template. In use, an AST segment that represents the source code segments MyPictureBox.X=50 and MyPictureBox.Y=100 is matched with the AST segment pattern associated with a replacement code template that generates the replacement code segment MyPictureBox.size=new size (50, 100).

In another exemplary mapping expression record, an AST segment pattern is defined for the expression (instance) Item_Type.property=(value), where value denotes a property that gets a certain value, and {0}.SetPropertyValue({1}) is defined as a replacement code template, where 0 denotes (instance) and 1 denotes (value). The replacement code template has a function that gets the same value as the function defined in the source code segment.

Optionally, different mapping expression records with different replacement code templates are generated for AST segment patterns that have similar structure but different conditioned property values. This allows converting source code segments with a similar code structure and properties, but with different values to a different replacement code segment or adapted replacement code segment. In exemplary mapping expression records, two AST segment patterns are documented. One AST segment pattern, (instance)Item_Type.property=(value>10), has a condition that states that the value of an item property is more than 10, while the other, (instance) Item_Type.property=(value<=10), has a matching condition that states that the item property value is 10 or less. For each AST segment pattern, a different replacement code template was created, for example, respectively {0}.SetPropertyLargeValue({1}) and {0}.SetPropertySmallValue({1}), where 0 denotes (instance) and 1 denotes (value). Consequently, there are two mapping expressions for source code segments that have a similar AST structure but different values.

Optionally, mapping expression records are sorted to a number of different data containers also referred to herein as mapping packages. Each data container enables the user to save and organize mapping expression records according to different criterion and/or criteria. Each mapping package contains mapping expression records which relate to different source code segments. Different mapping packages may contain different mapping expression records that relate to the same source code segment. Optionally, when mapping source code segments, different mapping expression records from different mapping packages may be used. For example, different mapping packages may be used for different target and/or source environments. For instance one package may be provided for converting source code segments from a VB6 environment to a C#.NET environment, and another package may be provided for converting source code segments from VB6 to VB.NET. In another example, different mapping packages may be created by different solution providers.

According to some embodiments of the present invention, mapping expression records are associated with a cost value. In such embodiments, a user may be charged according to the mapping expression records she uses. Optionally, as shown at FIG. 2B, the code migration system 200 is connected to a mapping expression store system 209 that monitors which mapping expression records are selected for migrating a certain source code and calculates offer(s) to be presented to the user before the code migration is made.

According to some embodiments of the present invention, the mapping is performed according to mapping expression records automatically selected from mapping package(s) identified as suitable for the target and source environments. Such mapping packages contain pre-defined mapping expressions that enable the user to migrate automatically at least some, usually most of the source code of the legacy application without any work on her part. Optionally, the system enables the user to add new expressions to the package and/or to adjust the existing mapping expressions.

Optionally, some existing mapping expression records include code extensions, for example predefined and/or user-defined. These code extensions are added to the migrated code, which is adapted for execution in the target environment, to bridge a gap between the source and target environments. Extensions may define, for example types, methods and properties. Optionally, only relevant types and members and properties are added to the target code.

As shown at 108, a presentation that is indicative of which source code segments have been matched and/or unmatched is generated based on the above described matching (depicted in block 107). The presentation indicates to the user which source code segments have been matched, and optionally with which matching respective replacement code segments. Optionally, unmatched source code segments are presented to the user, for example as an Error List (see FIG. 3A).

As described above, the presentation may be on a code editor. In such embodiments, the user may edit the mapping expressions, for example edit or create AST segment patterns and/or target code templates, add code extensions, add user remarks, define naming convention, rearrange target code segments, delete target code segments, and/or the like.

Optionally, as shown at 109, a target AST is created. Optionally, the AST of the source code is converted, using the target code templates of the matched mapping expressions, to a new AST suited for the target environment. The target AST represents the migrated code.

Now, as shown at 110, the target AST and optionally the environment specific code are used to generate the migrated code, which is suited for the target environment. Optionally, during the generation of the migrated code, environment related castings, conversions, and/or references are added. Optionally, during the generation of the migrated code, an environment reconstruction module is used to reconstruct environment specific code, for example VB modules to [class].[member] in C#. The environment reconstruction module receives the environment specific code from the migration code engine 203, and changes non-explicit code references to explicit code references.

The migrated code may be outputted, for example stored as a file in a storage container selected by the user. The final migrated code is optionally removed from any sign of conversion.

According to some embodiments of the present invention, the system 200 provides automatic code migration solution. In such embodiments, a target environment is selected, and the source code is matched with a number of mapping expressions as depicted in 101-107; however, in these embodiments, matching may not be presented to the user. The automatic code migration may be managed by a wizard that allows a user to load a code, for example of a legacy application, and uses the existing expression records to migrate automatically each code segment in the source code to a matching replacement code that is suitable for the target environment.

According to some embodiments of the present invention, the system is also used for assessing the complexity (e.g. amount of work and/or efforts) of converting the source code of the application. In such embodiments, the system may perform 101-107 and use the mapping information during the assessment process. Optionally, an assessment tool, for example as described below, outputs a report that indicates the complexity of the code migration process. The assessment may be determined according to a complexity indicator(s) identified in the unmatched AST segments, for example, the length and/or size of the source code segments. The assessment is optionally presented to the user, for example via the UI 208 of the system that is presented on a display, giving her an estimate about the affordability and profitability of the code migration.

Figure 5:
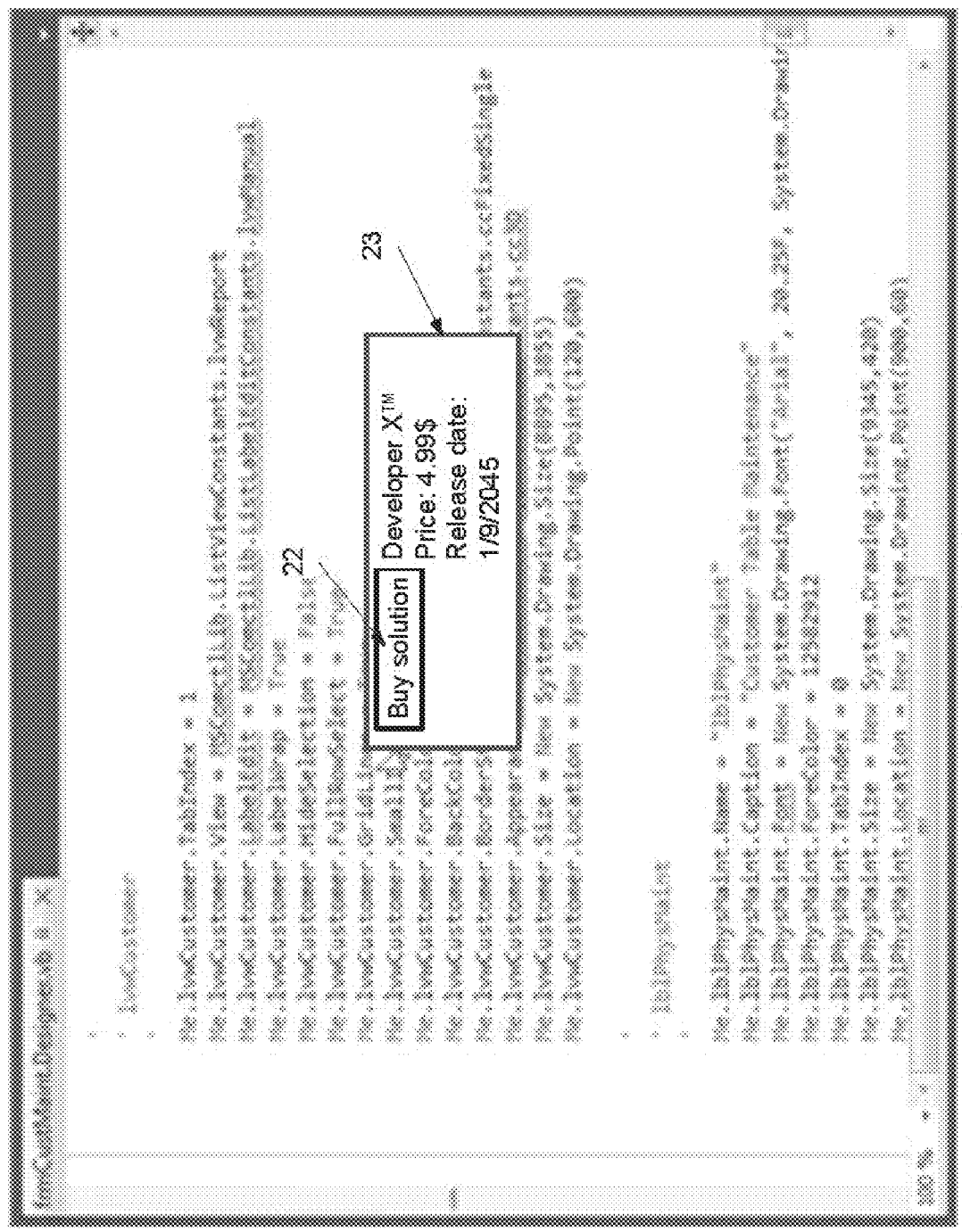
FIG. 5 is a screenshot of a UI presenting an exemplary source code segment and a textbox that includes a purchase button and information pertaining to a respective mapping expression, according to some embodiments of the present invention.

Reference is now made, once again, to the presentation depicted in 108. According to some embodiments of the present invention, the user is presented with offers to purchase mapping expressions. In such embodiments, offers are presented, optionally in association with the source code segments. The cost of a mapping expression is optionally a cost value associated with a respective mapping expression record. The offers are optionally presented in real time, after the source code is analyzed and respective mapping expression records are identified. The user may determine whether to purchase the mapping expressions, for example by clicking on a button that is presented thereto. For example, see FIG. 5, which is a screenshot of a UI presenting an exemplary source code segment, and a textbox 23 which includes a purchase button 22 and information pertaining to the respective mapping expression. Additionally or alternatively, the user is presented with a shopping list, indicating the cost of each mapping expression that may be purchased to convert the source code automatically or semi-automatically. For example, FIG. 6 depicts an exemplary shopping list. Optionally, designated buttons allows the user to remove and/or buy mapping expressions.

Optionally, offers to purchase mapping expressions are presented together with other mapping expressions, which are provided for free.

Optionally, offers to purchase mapping expressions may be promoted, for example highlighted and/or otherwise visually emphasized. In such an embodiment, an advertisement module may manage the promotions of mapping expressions.

Figure 7:
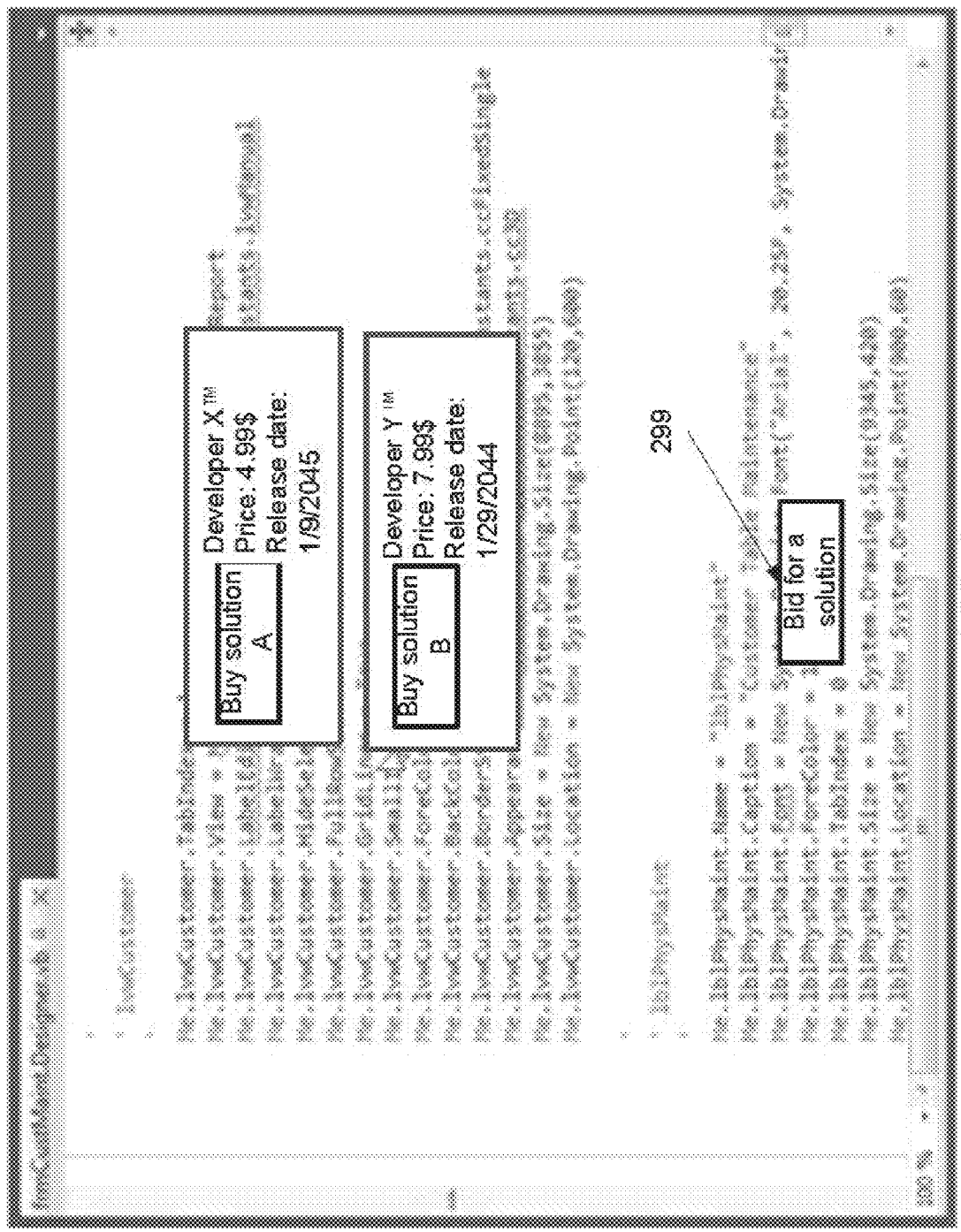
FIG. 7 is a screenshot of a UI presenting exemplary source code segments, a number of textboxes which includes purchase buttons and information pertaining to alternative mapping expressions, and a button for placing a bid for a solution, according to some embodiments of the present invention.

As described above, the database of mapping expression records may include a number of mapping expression records which are suitable for converting the same code segment associated with the same AST segment, for example different mapping expression records of different mapping packages provided by different developers. In such embodiments, a number of offers may be presented to the user for converting the same source code segment, for example as shown at FIG. 7. This allows the user to purchase a mapping expression from a developer he trusts, to purchase a mapping expression in a suitable price range, and/or the like. Optionally, the user may filter which offers are of interest to her, for example according to the price, the solution provider, uploading date, and/or the like.

In some embodiments of the present invention, the user may place a bid for a mapping expression that is suitable for a selected source code segment associated with a certain AST segment. The bid is optionally provided using a designated GUI, for example a "Bid for a solution" button that appears in association with the selected source code segment, for example numeral 299 in FIG. 7. In such an embodiment, the user may place a bid if no mapping expression is identified for a certain source code segment, and/or if the offers presented to the user are not attractive. The bid may now be forwarded to a plurality of developers, optionally listed in a designated contact group or a social network. The developers may respond with an offer to provide the requested mapping expression. The offer is optionally forwarded to the user and/or presented on the screen, in association with the relevant source code segment. After the user provides her acceptance, the developer provides the mapping expression. Crediting and/or debiting are optionally managed by a billing module, for example as defined below.

Figure 8:
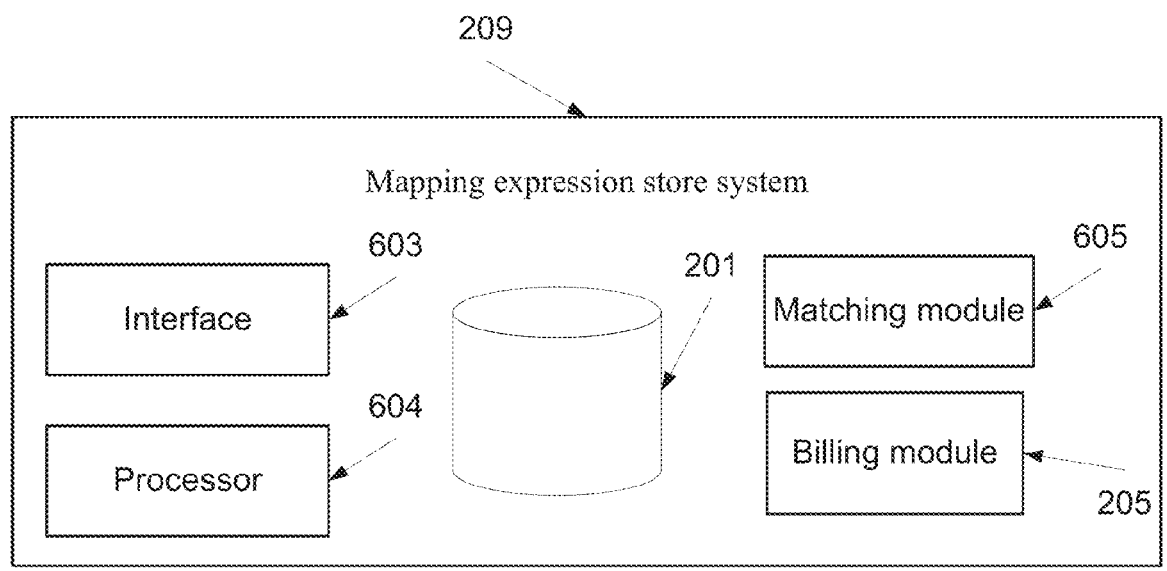
FIG. 8 is a schematic illustration of a system of managing mapping expression transactions, according to some embodiments of the present invention.

Reference is now made to FIG. 8, which is a schematic illustration of the components of the mapping expression store system 209 depicted in FIG. 2A, according to some embodiments of the present invention. As outlined above and further described below, a billing module 205 may be used for crediting and/or debiting solution providers and/or users. For example, a solution provider may upload her solution, for example in the form of a mapping expression record, to the database, optionally in association with a cost value. When a match between the solution provider's mapping expression record and a source code segment is identified, an offer to purchase the right to use the solution provider's mapping expression record is presented to the user. If the user chooses to purchase the solution provider's mapping expression record, the user is debited for the cost value and the solution provider is respectively credited, optionally after a mediation commission is wired to the account of the operator of the conversion solution store system 209.

Optionally, various rights may be purchased, for example an exclusive right, a single use right, a multiple use right, a multiple use right with limited usage terms, and/or the like. The various rights may be monitored and managed by the billing module 205 and/or an external unit.

As described above, mapping expressions may be purchased in real time, while the user uses the code migration system 200 for code migration in a controlled manner.

The mapping expression store system 209 includes a database 607 for storing a plurality of expression mapping records, each having a cost value, for example as described below. The mapping expression store system 209 further includes an interface 603 for receiving requests for a plurality of expression mapping records from a system, such as code migration system 200, which is installed on a client terminal and/or any network node. The mapping expression store system 209 further includes a matching module 605 for identifying records according to the requests in the database 607. The matched records are optionally forwarded as responses to the requests. In such embodiments, the request may include code segments to be matched with the AST segment patterns stored in the plurality of expression mapping records and/or code segment indications.

The mapping expression store system 209 provides an online solution distribution platform for solution providers. Optionally, the system 209 manages a web service that allows solution providers and users to browse and use mapping expressions from the database 607. Additionally or alternatively, the system 209 manages a web service that allows solution providers to upload mapping expressions to the database 607. Optionally, the web service allows the solution provider to set the price and/or the terms of use of the respective upload mapping expressions. In such a manner, a solution provider who uploads new solutions may distribute them free of charge or set different prices for different solutions, different purchasers, and/or for different usage rights. Optionally, the billing module 205 manages a plurality of solution provider profiles. This allows the billing module 205 to debit users for mapping expressions they used, for example for code migration. This also allows the billing module 205 to credit solution providers for mapping expressions they created. Additionally or alternatively, the system 209 manages a web service that allows developers to rank mapping expressions which are available in the database 607. Ranking is optionally calculated according to user inputs and stored in association with the respective mapping expression records. Optionally, the billing module 205 manages a prepaid account for some or all of the users. This may allow a user to select mapping expressions under a certain budget. Optionally, the billing module 205 manages subscribers that allow the user to acquire, during a limited period, some or all of the mapping expression records for a periodic fee, for example a yearly fee, a monthly fee, and/or the like. Once the mapping expression records are acquired, the user may use the output code according to a usage license, for example a perpetual license or a renewable license.

Briefly stated, during the code migration process, a user who uses the code migration system 200 may contact the mapping expression store system 209 for downloading, purchasing, selling, and/or exchanging existing mapping expressions with other developers online.

As described above, the mapping expression store system 209 functions as a marketplace for purchasing and selling mapping expressions. As described above, while some developers upload mapping expressions, others may purchase them. The mapping expression transactions are monitored and managed by the billing module 205, for example as described above.

It is expected that during the life of a patent maturing from this application many relevant methods and systems will be developed and the scope of the term a processor, a network, a database, and a module is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of converting a precompiled source code adapted to execute in a source environment to a target code adapted to execute in a target environment by a code migration process, comprising:

receiving a precompiled source code of an application, wherein said precompiled source code is adapted to execute in a source environment;

setting a target environment for converting said precompiled source code;

providing a plurality of mapping expressions, wherein each mapping expression associates one of a plurality of abstract syntax tree (AST) segment patterns with one of a plurality of replacement code templates defining target code segments suitable for execution in said target environment;

building an abstract syntax tree (AST) of said precompiled source code;

generating a document object model (DOM) representing types and attributes of a plurality of objects of said application, wherein said plurality of objects are extracted using said AST and environment components of said source environment which are extracted from the source code;
identifying a match between a first group of said plurality of AST segment patterns and a plurality of AST segments of said AST based on said types and attributes of said plurality of objects to identify a second group of said plurality of replacement code templates, wherein said plurality of AST segments are associated with a plurality of source code segments of said precompiled source code; and
performing a code migration process of said precompiled source code to a precompiled migrated code in said target environment using said second group, wherein said precompiled migrated code is adapted to be compiled into said application.

2. The method of claim 1, wherein said performing comprises:
displaying a presentation of said precompiled source code with an indication of said plurality of source code segments to a user; and
receiving code editing instructions from a user to adapt said code migration process.

3. The method of claim 2, further comprising receiving at least one of said plurality of AST segment patterns associated with another of said plurality of replacement code templates from said user and using said at least one AST segment pattern during said code migration process.

4. The method of claim 1, wherein said source environment and said target environment are different.

5. The method of claim 1, further comprising assembling a plurality of replacement precompiled code segments each generated according to another of said plurality of replacement code templates during said code migration to create said precompiled migrated code.

6. The method of claim 1, wherein each of at least some of said plurality of AST segment patterns has a matching condition associated with a parameter, wherein said matching comprises verifying a compliance of a respective parameter in a matched precompiled source code segment with said matching condition.

7. The method of claim 1, wherein each of at least some of said plurality of AST segment patterns has a matching condition associated with a plurality of interchangeable target parameters, wherein said matching comprises selecting one of said plurality of interchangeable target parameters according to a value of a parameter of a precompiled source code segment associated with a respective said AST segment.

8. The method of claim 1, wherein said environment components are extracted from said source code to allow generating said object model without having said environment components installed or reflected during said matching.

9. The method of claim 1, wherein each said AST segment pattern is stored with an associated said replacement code template in a common mapping expression record of said plurality of mapping expression records.

10. A non-transitory computer readable medium comprising computer executable instructions adapted to perform the method of claim 1.

11. A method of presenting an outcome of a process for matching replacement code templates to source code segments for code migration, comprising:
providing a precompiled source code of an application, wherein said precompiled source code is adapted to execute in a source environment;
setting a target environment for converting said precompiled source code;
generating a document object model (DOM) representing types and attributes of a plurality of objects of said application, wherein said plurality of objects are extracted using an abstract syntax tree (AST) of said precompiled source code and environment components of said source environment which are extracted from the source code;
matching between a plurality of mapping expressions, wherein each mapping expression associates one of a plurality of AST segment patterns with one of a plurality of replacement code templates and some of a plurality of AST segments of an AST of said precompiled source code based on said types and attributes of said plurality of objects;
generating a presentation of said precompiled source code with an indication of which of said plurality of source code segments is represented by at least one AST segment of said AST which is not matched with at least one of said plurality of replacement code templates; and
displaying said presentation to a user.

12. The method of claim 11, wherein said presentation is displayed in a code editor window.

13. A system of converting a precompiled source code, comprising:
a database which hosts a plurality of mapping expression records, wherein each one of said plurality of mapping expression records associates between one of a plurality of AST segment patterns and one of a plurality of replacement code templates defining target code segments suitable for execution in a target environment;
an interface which receives a precompiled source code of an application;
a processor adapted to execute a code for:
setting said target environment for converting said precompiled source code:
building an abstract syntax tree (AST) of said precompiled source code;
generating a document object model (DOM) representing types and attributes of a plurality of objects of said application, wherein said plurality of objects are extracted using said AST and environment components of said source environment which are extracted from the source code;
associating between each one of a plurality of AST segments of said AST with a plurality of source code segments of said precompiled source code by identifying a match between a first group of said plurality of AST segment patterns and said plurality of AST segments based on said types and attributes of said plurality of objects;
instructing a code editor to display a presentation of said precompiled source code with an indication of said plurality of source code segments and receiving code editing instructions from a user to adapt a code migration process of said precompiled source code to a precompiled migrated code in said target environment using a templates group of said plurality of replacement code templates, wherein said precompiled migrated code is adapted to be compiled into said application.

14. The system of claim 13, wherein said processor is adapted to match between a patterns group of said plurality of AST segment patterns and said plurality of AST segments to identify said templates group.

15. The system of claim 13, wherein said code editor allows a user to edit at least one of said plurality of mapping expression records.

* * * * *